July 24, 1956  C. HEISE  2,756,104
MEASURING AND SPRAYING DEVICE
Filed Jan. 5, 1952  3 Sheets-Sheet 2

INVENTOR
Carl Heise

BY Richard Lorp
AG'T

July 24, 1956  C. HEISE  2,756,104
MEASURING AND SPRAYING DEVICE
Filed Jan. 5, 1952  3 Sheets-Sheet 3
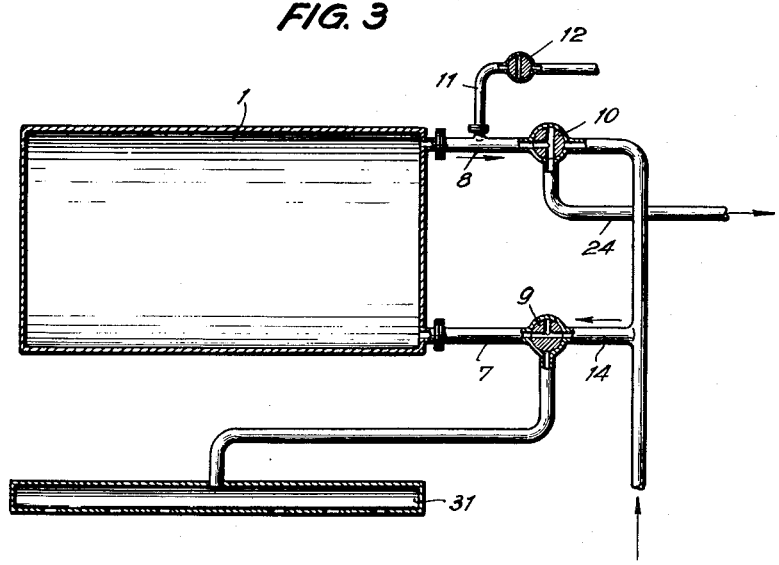
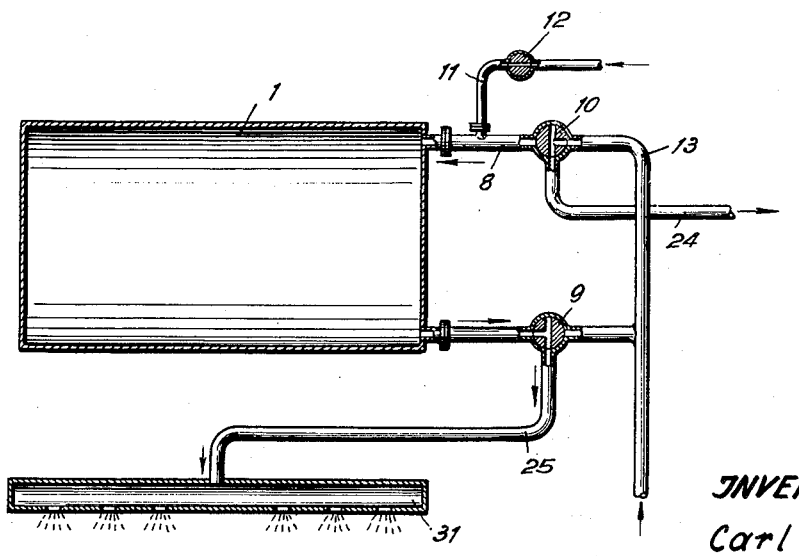
INVENTOR
Carl Heise
BY Richard Low
AG'T

United States Patent Office 2,756,104
Patented July 24, 1956

2,756,104

MEASURING AND SPRAYING DEVICE

Carl Heise, Alfeld (Leine), Germany

Application January 5, 1952, Serial No. 265,148

Claims priority, application Germany January 8, 1951

3 Claims. (Cl. 299—95)

This invention relates to a bitumen or other binders measuring and spraying device for use in machines for the preparation of roadmaking materials and the like.

Roadmaking material is mechanically prepared as a rule by means of practically automatically operating drying and mixing machines. First, stone material selected as to grain size is placed in an oil-fired drying drum, then passed by a hot bucket conveyor into a weighing silo and thence after the addition of a certain amount of stone powder and a weighed quantity of tar or bitumen to a suitable mixer which delivers the mixture to transfer containers.

It has been the usual practice hitherto to pass the circulating hot tar or bitumen through a cock into a trough disposed above the mixer and suspended from weighing scales. The weighed quantity of binder was then put into the mixer by tilting the trough.

As this arrangement, however, does not permit exact determination of the amount of binder to be added and its proper distribution over the stone material, it is the object of the invention to provide improved means for this purpose.

According to the invention, this problem can be solved by placing in the circulating stream of hot bitumen or other binder a measuring vessel which is flown through, wholly or in adjustable parts, by this stream and which on reversal of the stream spills or sprays the binder contained therein over the material, either directly or indirectly, due to pneumatic or mechanical pressure exerted thereon.

Figure 1:
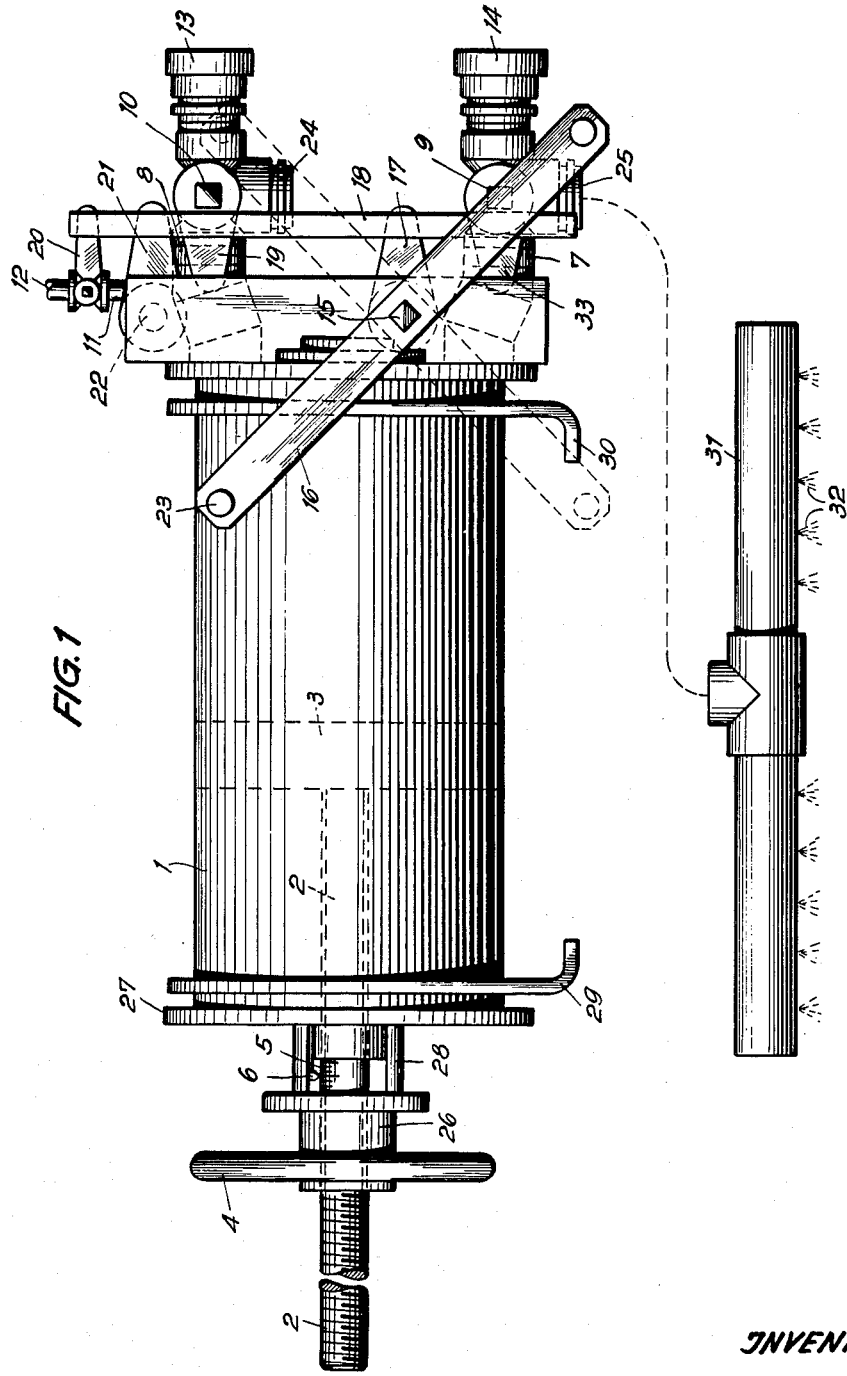
Figure 2:
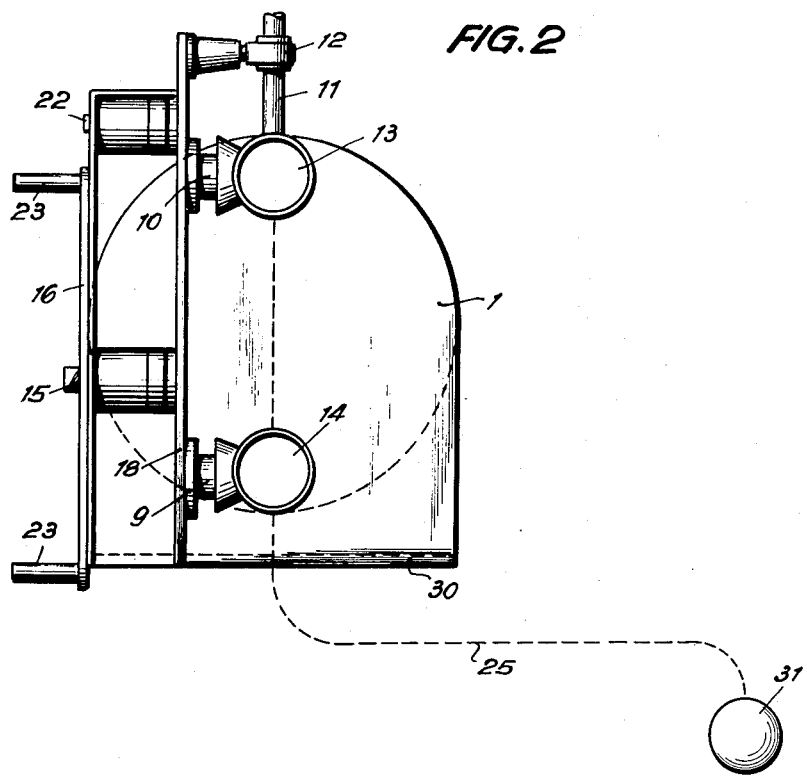

One embodiment of the invention is diagrammatically illustrated in the accompanying drawing, wherein Figure 1 is a side view of the device provided with a spraying pipe;

Fig. 2, a front view thereof in the direction of the arrow;

Fig. 3 shows the piping diagram and arrangement of the valves for filling; and

Fig. 4, the piping diagram and arrangement of the valves for spraying.

In Fig. 1, a measuring cylinder 1 rests on supports 29, 30 and possesses a measuring flask 3 fitted with an adjusting spindle 2 and capable of being adjusted by a hand wheel 4 rotatably disposed on an apertured guide sleeve 26 secured to the measuring cylinder 1. At the aperture a pointer 6 is disposed. The adjusting spindle 2 has a scale 5 showing ½ l. graduations, on which the position of the measuring flask 3 in the cylinder can be read.

In the stream of hot bitumen or other binding agent circulated by means of a pump, not shown, the measuring cylinder 1 is disconnectibly arranged by means of conduits 13, 14 fitted with three-way-stopcocks 9, 10. The three-way cock 9 is in communication with the measuring cylinder 1 by a conduit 7, and the other three-way cock 10 communicates with the cylinder 1 through the conduit 8 into which opens a compressed air main 11 which can be shut off by a stopcock 12. The three-way cock 10 is connected to a conduit 24 leading to a reservoir, not shown, for bitumen or other binders. To the three-way cock 9 a conduit 25 is connected which leads to a spraying pipe 31 fitted with nozzles 32. The three-way cocks 9, 10 are coupled together and with the compressed air cock 12 jointly controlled by operating means, as levers, double levers or a hand wheel. In the embodiment shown the operating levers 33 and 19 of the three-way cocks 9, 10 and the operating lever 20 of the compressed air cock 12 are, for this purpose, articulated in slots by a control rod 18 which is articulated to guide levers 17, 21. The guide lever 17 is actuated by the double lever 16 fitted with handles 23 and arranged at 15 so as to be rotatable with lever 17. The guide lever 21 for the control rod 18 is rotatably disposed at 22.

The mode of operation is as follows:

Fig. 1 shows two positions of the double lever 16, the one indicated by heavy lines being occupied during the filling operation. In this position the measuring vessel 1 is ready to receive a portion of the circulating stream of bitumen or other binder. From the pump, not shown, the stream flows in the direction of the arrow through the conduit 14, the three-way cock 9 and the conduit 7 into the measuring cylinder 1 and fills it to the extent determined by the adjustment of the measuring flask 3. The stream then flows back through the conduit 8, the three-way cock 10 and the conduit 24 to the reservoir, not shown. As long as the double lever 16 remains in this position the measuring cylinder 1 is constantly flown through by the hot binder stream, as indicated particularly in Fig. 3. The hand wheel 4 serves for adjusting with the aid of the scale 5 the number of liters to be admitted to the measuring cylinder 1 and subsequently to be distributed over the stone material. As binders differing in specific gravity have to be handled, a conversion diagram facilitates the conversion of liters into kilograms to ascertain the percentage of binders of the contents of the mixer. The number of liters to be admitted by the hand wheel can thus be instantly read on the diagram.

This filling operation is diagrammatically shown in Fig. 3. The compressed air cock 12 is closed, the three-way cock 9 permits flow only in the direction of the measuring vessel 1 and the three-way cock 10 allows only the discharge from the vessel 1 through the conduit 24 to the reservoir, not shown.

By turning the double lever 16 into the position indicated by broken lines in Fig. 1 the accurately measured quantity of binder is then sprayed into the mixer.

By means of the guide levers 17, 21 the control rod 18 is then moved downward, whereby the measuring cylinder 1 is cut off from the stream of binders due to the action of the three-way cocks 9, 10. The piping diagram in Fig. 4 shows the course of the stream when this happens. As shown in this diagram the stream flows through conduit 13 to the three-way cock 10 and after reversal flows back through conduit 24 to the reservoir, not shown, without flowing through the measuring vessel. Simultaneously, the compressed air cock 12 is opened by the control rod 18, compressed air flows through conduits 11 and 8 into the measuring cylinder 1 and drives the binder contained therein through the three-way cock 9 and conduit 25 into the spraying pipe 31 the nozzles 32 of which then spray the accurately and uniformly dosed binder over the stone material in the mixer.

I claim:

1. Installation for measuring bituminous and similar binders for road-making materials and for spraying same onto such materials, comprising a cylinder; a distributor; a system of conduits for conducting the binder from a reservoir to the cylinder and thence back to the reservoir, for circulating the binder from and back to the reservoir, and for conducting the binder from the cylinder to the distributor; and control means provided in said system of conduits and operative to communicate the cylinder with the distributor while the cylinder is isolated from the reservoir and the binder is continuously recirculated from and to the reservoir, and alternately to isolate said cylinder from said distributor while the binder is continuously circulated from the reservoir through said cylinder and back to the reservoir, said system of conduits including a delivery pipe leading to the cylinder, a pipe branching off from said delivery pipe and leading to the distributor; a discharge pipe leaving the cylinder, a continuation delivery pipe communicating with the discharge pipe, and said control means including two three-way cocks, one of said cocks being provided at the junction of the delivery pipe and the branch pipe leading to the distributor, the other cock being provided at the junction of the discharge pipe and the continuation delivery pipe.

2. An installation according to claim 1, further comprising a conduit connecting a compressed air supply source with the discharge pipe at a point between the cylinder and the junction of discharge pipe and continuation delivery pipe, and a cock in the said compressed air supply conduit.

3. An installation according to claim 2, wherein said control means further includes a mechanism including a member simultaneously actuating the two three-way cocks and the cock in said compressed air supply conduit, and means to operate said member.

References Cited in the file of this patent

UNITED STATES PATENTS

| | | |
|---|---|---|
| 1,097,091 | Gray | May 19, 1914 |
| 1,325,513 | Fricker | Dec. 23, 1919 |
| 1,526,908 | Gates | Feb. 17, 1925 |
| 1,750,872 | Bremer | Mar. 18, 1930 |
| 2,123,156 | Jagoe | July 5, 1938 |

FOREIGN PATENTS

| | | |
|---|---|---|
| 850,904 | France | Sept. 18, 1939 |